Figure 1:
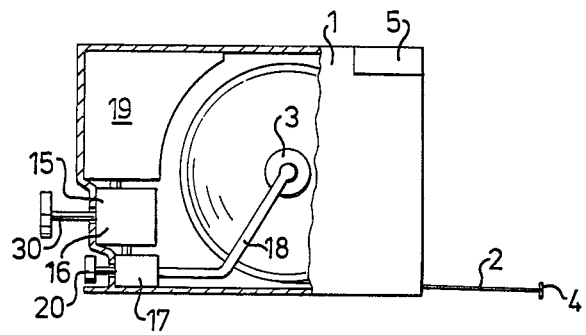

United States Patent [19]

Bergkvist

[11] 4,275,503

[45] Jun. 30, 1981

[54] UNCOILING AND COILING TAPE MEASURE

[76] Inventor: Lars A. Bergkvist, Gottne, 890 42, Mellansel, Sweden

[21] Appl. No.: 5,815

[22] Filed: Jan. 23, 1979

[30] Foreign Application Priority Data

Jan. 30, 1978 [SE] Sweden .............................. 7801120

[51] Int. Cl.³ .................. G01B 3/02; E04H 12/18; B65H 75/16
[52] U.S. Cl. .................................. 33/137 R; 33/138; 52/108; 242/84.8
[58] Field of Search ................. 33/137 R, 137 L, 138; 40/478; 46/44; 242/84.8, 54 A; 52/108

[56] References Cited

U.S. PATENT DOCUMENTS

| 1,947,392 | 2/1934 | Guntermann et al. | 242/84.8 |
| 2,212,128 | 8/1940 | Richter | 46/44 |
| 3,364,632 | 1/1968 | Isaac | 242/54 A |

Primary Examiner—Steven L. Stephan
Attorney, Agent, or Firm—LeBlanc, Nolan, Shur & Nies

[57] ABSTRACT

A coiling tape measure which is coiled and stored in a housing. In its uncoiled state the tape has a slightly curved cross-sectional section with a convex lower surface. On its convex lower surface there are one or more closed channels and a device is provided for supplying a pressure medium to said closed channels to effect an increase in the self-supporting capacity of the tape measure. Several embodiments of the channels on the convex surface and several embodiments of the pressure supply device are disclosed.

8 Claims, 7 Drawing Figures

U.S. Patent  Jun. 30, 1981  4,275,503

UNCOILING AND COILING TAPE MEASURE

BACKGROUND OF THE INVENTION

This invention relates to a tape measure capable to be uncoiled and coiled.

Tape measures, which are stored coiled in a housing and pulled out therefrom for the measuring operation while the tape measure is uncoiled from a reel or the like in the housing, so-called number meters, are well-known. The tape measure, in order to have a certain self-supporting capacity in pulled-out state, in the horizontal plane, is made of metal and has a curved cross-sectional shape.

A conventional tape measure of this kind is self-supporting when the length pulled out is shorter than about 1 m. When the length pulled out is longer, a fold is formed in the tape transverse to its longitudinal direction. When the housing or the tape are treated with slight incautiousness, said self-supporting length is only about 0.5 m. These stated lengths, of course, vary from one case to another. It is, however, a very great disadvantage that the tape cannot be pulled out to its entire length, which most often is 2 m or longer, without giving rise to fold formation in the tape. The said disadvantage implies above all, that measurements of a length exceeding that at which the tape is self-supporting, are carried out with great difficulty.

OBJECTS OF THE INVENTION

A primary object of the present invention resides in the provision of a novel tape measure which solves the aforesaid problems.

Further, it is an object to provide a coiling form of tape measure whose cross-section is curved with the bottom of at least the uncoiled tape being convex and having one or more closed channels extending along the tape measure with apparatus to introduce fluid under pressure into the closed channel or channels to increase the ability of the uncoiling tape measure to support itself in an uncoiled condition.

In conjunction with the foregoing object other objects include different channel configurations and devices to pressurize the channels included in a storage case for the tape measure.

Further novel features and other objects of this invention will become apparent from the following detailed description, discussion and the appended claims taken in conjunction with the accompanying drawings.

Figure 2:
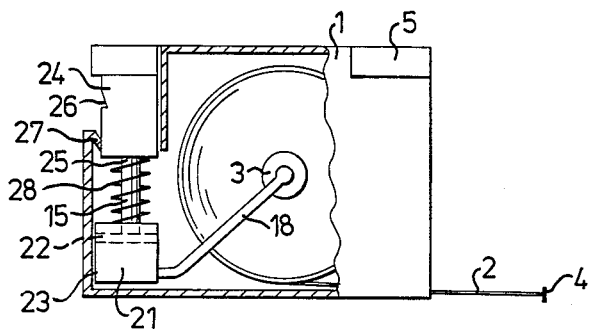
Figure 3A:
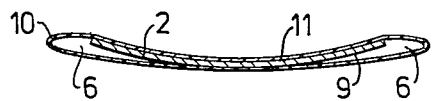
Figure 4A:
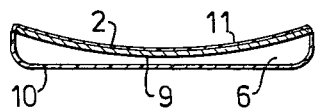
Figure 5:
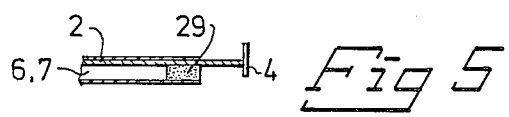

FIG. 1 in a schematic manner shows a tape measure according to the invention, a wall portion being removed, FIG. 2 shows in a schematic manner a tape measure according to the invention at another embodiment, a wall being removed, FIGS. 3a,b show the tape measure according to one embodiment by way of a cross-section, FIGS. 4a,b show the tape measure according to another embodiment by way of a cross-section, FIG. 5 shows an outer end of a tape measure according to said first mentioned embodiment.

In FIGS. 1 and 2 a tape measure according to the invention is shown by way of two different embodiments. Said Figures show a housing 1, in which the tape measure 2 is stored in coiled state on a reel 3 or the like. The tape measure 2 can be uncoiled from said housing 1 by pulling at the free end 4 of the tape. Within said housing a ratchet or brake is provided for locking the tape 2 in pulled-out state. Said ratchet or brake is of known type and actuated by a button 5. The tape 2 at least in uncoiled state has in known manner a slightly curved cross-sectional shape as is apparent from FIGS. 3a and 3b.

The tape 2 is provided on its lower convex surface 9 with one or more channels along preferably the entire tape 6,7,8, where the convex surface 9 preferably constitutes a wall of the channel or channels 6,7,8. Said channel or channels are formed of a tubular member 10 of a ductile material, preferably plastic, which member entirely encloses said tape and is attached to the upper concave surface 11 of the entire tape.

The channel or channels thus are formed at the lower convex surface 9 of the tape. When two channels 7,8 are formed, said member 10 is attached along a certain distance, seen in the transverse direction of the tape and marked by a bracket 12 in FIG. 4b, at the lower convex surface 9 of the tape 2, so that two substantially symmetrically located channels 7,8 are formed which extend to the respective edges 13,14 of the tape.

A device designated in general by 15 further is located within or in connection to said housing 1 for supplying pressure medium to the channel 6 or channels 7,8. The pressure medium may be a suitable hydraulic pressure medium, for example oil, water, water-glycol.

According to one embodiment shown in FIG. 1 a pump 16 of a known type comprising a piston with associated cylinder, and a check valve 17 of a known type are provided. Upon a movement of the piston effected by the piston rod 30, the pump 16 pumps pressure medium via the check valve 17 and a pipe 18 into the channel or channels until a desired pressure in the channel or channels is obtained. The check valve 17 prevents pressure medium from flowing from the channel or channels to the pump 16.

The pipe 18 is connected rotatably in known manner to the channels on the innermost coil of the tape 2 on the reel 3. Possibly several pump movements are required, depending on the cross-sectional area and length of the channels. In this case pressure medium is supplied to the pump 16 from a reservoir 19. Said pumping takes place first after the tape 2 has been pulled out of the housing 1 to the desired length.

When the tape is be coiled in the housing after completed measuring operation, a button 20 is depressed whereby the check valve 17 is opened so that pressure medium is permitted to flow from the channel or channels to the pump 16 and, where appropriate, to the reservoir 19.

According to a second embodiment shown in FIG. 2 a pump 21 is provided, which upon movement of its piston 22 in one direction, downward in FIG. 2, pumps up said pressure and at movement in opposite direction sucks pressure medium from the channel or channels. When the pressure has been pumped up, the position of the piston 22 relative to the cylinder 23 is locked, in that, for example, a control button 24 at the end of the piston rod 25 of the piston 22 is locked relative to the housing 1. Hereby, for example, a notch 26 in the control button can be caused to engage with a corresponding cam 27 on the housing 1. When pressure medium is to be sucked back in the cylinder 23, the control button 24 is released by a slight pressure against the housing 1 whereby a spring 28 forces the control button 24, and therewith the piston 22, upward.

Said channels 6,7,8, thus, can substantially only contain pressure medium when the tape is in an uncoiled and in a coiled state, with the difference that the pressure in the pressure medium substantially is atmospheric pressure or lower when the tape is coiled, and considerably higher when the tape is uncoiled.

In a case when the greater part of the pressure medium is desired to be withdrawn to the pump 15,21 or a reservoir 19 when the tape is being coiled, this like a transport of the pressure medium out into the channels can be facilitated in that a filter 29 is provided in the outermost end of the channel 6 or channels 7,8, which filter 29 is capable to permit the passage of air and to be impervious to the pressure medium. Such filters are well-known and commercially available, e.g., filters made of finely sintered material or a plastic membrane capable and per se are not an invention herein.

Figure 3B:
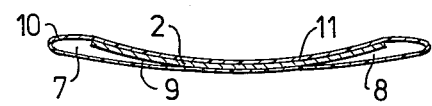
Figure 4B:
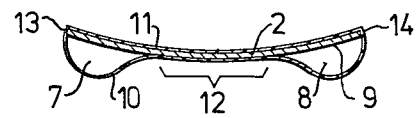

The channels, however, as mentioned are made of a ductile material. This implies that the volume of the channels directly increases with the amount of pressure medium supplied and directly decreases with the amount of pressure medium removed. In FIGS. 3a and 3b the channels are shown compressed to a small volume. In FIGS. 4a and 4b the channels are shown with maximum volume.

The tape measure according to the invention can be used for measuring in pulled-out state of the tape when the length pulled out exceeds the length, at which the own self-supporting capacity of the tape is sufficient to maintain the pulled-out portion of the tape straight. This is achieved by the invention in that, after the tape has been pulled out, pressure medium is pumped into the channels 6 and, respectively, 7,8 until the pressure is sufficient to keep the tape straight. The fact that the tape is stiffened by a pressure in the channels, has its reason in the known circumstance that every bending or folding of the tape results in a decreasing volume of the channels, whereby the pressure additionally increases, which produces a force tending to straighten the tape.

The advantages obtained with the present invention are great, in that the measuring work is simplified, especially when distances of several meters are to be measured, without for that reason making the tape measure substantially greater.

The invention also renders it possible to manufacture tape measures for use by one person, at which the length of the tape measure by far exceeds the length of the tape in known number meters or the like.

The invention has been described above with reference to a tape measure of the type number meter, but it may, of course, also be applied to other types of tape measures.

The design and location of the channels may be different from those shown, and also the supply of pressure medium may be effected in a different way without abandoning the idea of the invention.

The invention, thus, must not be regarded restricted to the embodiments described above, but can be varied within its scope defined in the attached claims.

I claim:
1. An uncoiling and coiling tape measure and a housing within which said coiled tape is stored, said tape measure at least in uncoiled state, having a slightly curved cross-sectional section with a convex lower surface and a concave upper surface comprising: said tape, only on and along its convex lower surface and opposite to said concave upper surface, being provided with at least one channel; a device carried by said housing and including means connected to said channel for supplying a fluid pressure medium to said channel to effect a substantial increase in the self-supporting capacity of the uncoiled tape measure.

2. An uncoiling and coiling tape measure according to claim 1, wherein said at least one channel is a tubular plastic member.

3. An uncoiling and coiling tape measure according to claim 1, characterized in that said device (15) comprises a pump (16,21) comprising a piston with associated cylinder located in the housing (1) and capable at movement of the piston to effect increase in pressure in the channel (6), and a check valve (17) between the pump (16) and the channel, which valve upon actuation permits pressure medium to flow from the channel to the pump or to a reservoir (19) connected to said pump.

4. An uncoiling and coiling tape measure according to claim 3, characterized in that said pump is capable upon movement of the piston (22) in one direction to pump up said pressure and upon movement in opposite direction to suck pressure medium from the channel (6) or channels (7,8).

5. An uncoiling and coiling tape measure according to claim 3, characterized in that a filter (29) is provided in the channel (6) or channels (7,8), at the outermost end thereof, for permitting air to pass and to be impervious to said pressure medium.

6. An uncoiling and coiling tape measure and a housing within which said coiled tape is stored, said tape measure at least in uncoiled state, having a slightly curved cross-sectional section with a convex lower surface, and a concave upper surface comprising: said tape on its convex lower surface and opposite to said concave upper surface being provided with at least one channel; a device carried by said housing and including means connected to said channel for supplying a fluid pressure medium to said channel to effect a substantial increase in the self-supporting capacity of the uncoiled tape measure; said at least one channel being a tubular member made from a ductile material, said member surrounding said tape and attached to the upper concave surface of said tape along substantially the entire length of said tape.

7. An uncoiling and coiling tape measure according to claim 6, wherein two channels (7,8) are formed, characterized in that said member (10) is also attached along a certain distance (12), seen in the cross-section of said tape, at the lower convex surface (9) of the tape (2), so that two substantially symmetrically located channels (7,8) are formed which extend to the respective edges (13,14) of the tape (2).

8. An uncoiling and coiling tape measure according to claim 6, characterized in that said at least one channel (6,7,8) substantially contain only pressure medium both when the tape (2) is in an uncoiled and in a coiled state.

* * * * *